(12) United States Patent
Kwon et al.

(10) Patent No.: US 10,391,889 B2
(45) Date of Patent: Aug. 27, 2019

(54) SYSTEM FOR CONTROLLING REAR SEAT ACCORDING TO SEATING MODE AND METHOD THEREFOR

(71) Applicants: Hyundai Motor Company, Seoul (KR); Kia Motors Corporation, Seoul (KR)

(72) Inventors: Mi-Sun Kwon, Seoul (KR); Sang-Do Park, Gyeonggi-do (KR); Hoon-Bok Lee, Gyeonggi-do (KR); Ji-Hee Han, Gyeonggi-do (KR); Sang-Woo Park, Seoul (KR); Cheol-Joo Kim, Seoul (KR); Sang-June Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 276 days.

(21) Appl. No.: 15/341,676

(22) Filed: Nov. 2, 2016

(65) Prior Publication Data

US 2017/0158086 A1     Jun. 8, 2017

(30) Foreign Application Priority Data

Dec. 4, 2015 (KR) .................. 10-2015-0172739

(51) Int. Cl.
*B60N 2/02* (2006.01)
*B60N 2/06* (2006.01)
(Continued)

(52) U.S. Cl.
CPC .......... *B60N 2/0244* (2013.01); *B60N 2/002* (2013.01); *B60N 2/0232* (2013.01); *B60N 2/06* (2013.01);
(Continued)

(58) Field of Classification Search
CPC ............ B60N 2002/0268; B60N 2/002; B60N 2/0232; B60N 2/0244; B60N 2/06;
(Continued)

(56) References Cited

U.S. PATENT DOCUMENTS

| | | | |
|---|---|---|---|
| 6,820,911 B2 | 11/2004 | Furui | |
| 2004/0007906 A1* | 1/2004 | Park | B60R 11/0235 297/217.3 |

(Continued)

FOREIGN PATENT DOCUMENTS

| | | |
|---|---|---|
| JP | 2007-112190 A | 5/2007 |
| KR | 1999-0074038 A | 10/1999 |

(Continued)

OTHER PUBLICATIONS

Machine translation of EP1245444, Oct. 2002, Merz, Bernd.*

*Primary Examiner* — Kira Nguyen
(74) *Attorney, Agent, or Firm* — Mintz Levin Cohn Ferris Glovsky and Popeo P.C.; Peter F. Corless

(57) ABSTRACT

A system for controlling a seat of a vehicle includes a relax mode to ensure ride quality to a passenger seated on a rear seat and sequentially drive respective electrically-powered portions of the rear seat to positions to secure the ride quality, a monitor mode to sequentially drive the respective electrically-powered portions of the rear seat so as to view a monitor apparatus primarily attached to a rear surface of a front seat, a reading mode to sequentially drive the respective electrically-powered portion of the rear seat so as to allow the passenger to perform reading by using a lighting lamp attached to a rear seat region, and a return mode to sequentially drive the respective electrically-powered portions of the front seat and the rear seat to positions just (Continued)

before moving the front seat and the rear seat to predetermined standard portions or the positions of the respective modes.

12 Claims, 10 Drawing Sheets

(51) Int. Cl.
    *B60N 2/809*     (2018.01)
    *B60N 2/00*     (2006.01)
    *B60N 2/16*     (2006.01)
    *B60N 2/22*     (2006.01)

(52) U.S. Cl.
    CPC ............... *B60N 2/16* (2013.01); *B60N 2/22* (2013.01); *B60N 2/809* (2018.02); *B60N 2002/0268* (2013.01)

(58) Field of Classification Search
CPC . B60N 2/16; B60N 2/22; B60N 2/809; B60N 2/4808
See application file for complete search history.

(56) References Cited

U.S. PATENT DOCUMENTS

| | | | |
|---|---|---|---|
| 2004/0129478 A1* | 7/2004 | Breed | B60N 2/002 180/273 |
| 2010/0066137 A1 | 3/2010 | Sakai et al. | |
| 2013/0038107 A1* | 2/2013 | Tamura | B60N 2/0232 297/331 |
| 2013/0341986 A1 | 12/2013 | Willey | |

FOREIGN PATENT DOCUMENTS

| | | |
|---|---|---|
| KR | 10-2012-0063384 A | 6/2012 |
| KR | 2014-0065299 A | 5/2014 |

* cited by examiner

RELAX MODE

LIMITED RELAX MODE

MONITOR MODE

READING MODE

SYSTEM FOR CONTROLLING REAR SEAT ACCORDING TO SEATING MODE AND METHOD THEREFOR

CROSS-REFERENCE TO RELATED APPLICATION

This application claims under 35 U.S.C. § 119(a) the benefit of Korean Patent Application No. 10-2015-0172739, filed on Dec. 4, 2015 in the Korean Intellectual Property Office, the entire contents of which are incorporated by reference herein.

BACKGROUND

1. Technical Field

The present invention relates to a system for controlling a seat of a vehicle and a method therefor, and more particularly, to a system for controlling a rear seat and a method therefor which perform a relax mode to ensure ride quality to a passenger seated on a rear seat and sequentially drive respective electrically-powered portions of the rear seat, a monitor mode to sequentially drive the respective electrically-powered portions of the rear seat so as to view a monitor apparatus primarily attached to a rear surface of a front seat, a reading mode to sequentially drive the respective electrically-powered portions of the rear seat so as to allow the passenger to perform reading, and a return mode to sequentially drive the respective electrically-powered portions of the front seat and the rear seat to positions just before moving the front seat and the rear seat to predetermined standard portions or the positions of the respective modes.

2. Description of the Related Art

In seats installed in a vehicle, a driver's seat is positioned at a front side and a passenger's seat is positioned on the side of the driver's seat, and rear seats are installed at left and right sides of the rear side, respectively.

Each of the rear seats may be mounted with devices for controlling positions of various portions, such as forward and backward slide movement of the seat itself, control (called 'shoulder adjust' movement) of an inclination angle of a shoulder portion of the seat, up, down, and forward and backward movements of a head rest, forward and backward movements of a lumbar support of the seat, up and down movements and forward and backward length control (called movement of a 'leg support') of the leg support separately mounted on the bottom of the seat, respectively, so as to secure convenient and comfortable ride quality.

While it may be advantageous that various portions are made to be movable in one seat, a time for operating the seat may be further inevitably required while controlling the position control devices of various portions, respectively, and thus the operating process itself may be cumbersome.

Further, as the rear seat contacts a driver's seat or a passenger's seat at a front side while controlling the position for each portion of the rear seat, it may also be difficult to control the rear seat and to this end, positions of the front seats need to be considered at the time of controlling the rear seat.

SUMMARY

The present invention provides a system for controlling a rear seat according to a seating mode and a method therefor which can provide a seating mode to ensure ride quality to a passenger who is seated on the rear seat and sequentially move respective portions of the rear seat to positions to secure the ride quality, further, a seating mode to sequentially move the respective portions of the rear seat so as to view a monitor apparatus primarily attached to a rear surface of a front seat, and a seating mode to allow a passenger to easily perform reading on the rear seat by using a lighting lamp attached to a rear seat region.

An exemplary embodiment of the present invention provides a system for controlling a rear seat according to a seating mode and a method therefor perform a relax mode to ensure ride quality to a passenger who is seated on the rear seat and sequentially drive respective electrically-powered portions of the rear seat to positions to secure the ride quality, a monitor mode to sequentially drive the respective electrically-powered portions of the rear seat so as to view a monitor apparatus primarily attached to a rear surface of a front seat, a reading mode to sequentially drive the respective electrically-powered portions of the rear seat to allow a passenger to easily perform reading on the rear seat by using a lighting lamp attached to a rear seat region, and a return mode to sequentially the respective electrically-powered portions of the front seat and the rear seat to positions just before the front seat and the rear seat before moving to predetermined standard positions or positions of the respective modes.

Since the system for controlling the rear seat according to the seating mode and a method therefor in the present invention can perform a relax mode to ensure ride quality to a passenger seated on a rear seat, a monitor mode to provide a view angle and a seat position suitable for viewing a monitor and increase customer convenience in link with a monitor power supply, a reading mode to provide the seat position so as to perform reading and simple business and improve the customer convenience in link with a power supply of a reading lamp, and a return mode to provide the seat position for get-on and get-off convenience of the passenger and initialization of the seat position only through one-touch operation of each switch, waste of a time and inconvenience which are caused in individually operating a lot of switches for seat movement in the related art can be solved and furthermore the customer convenience can be remarkably improved, and productivity of the vehicle can be promoted.

DETAILED DESCRIPTION OF THE EMBODIMENTS

Figure 1:
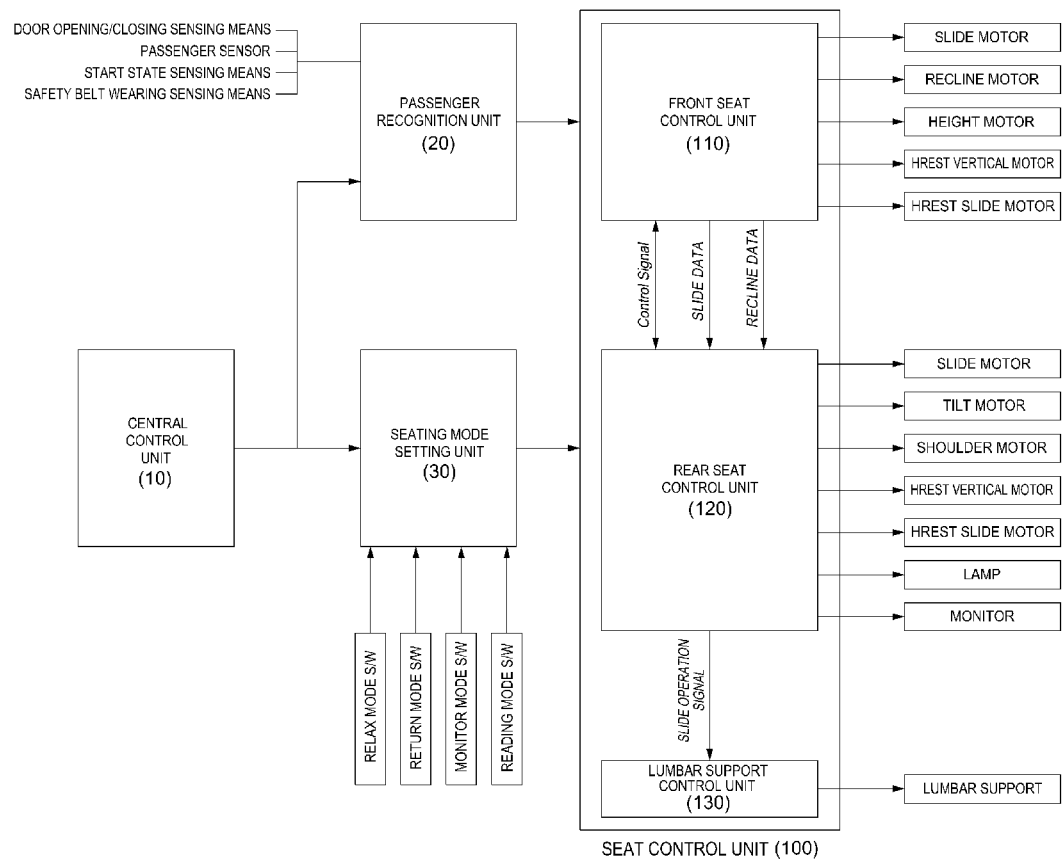
FIG. 1 is a block diagram of a system for controlling a rear seat according to a seating mode of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, configurations and operations of a system for controlling a rear seat according to a seating mode and a method therefor in the present invention will be described with reference to the accompanying drawings.

A system for controlling a rear seat according to a seating mode of the present invention has a so-called 'relax mode' which is a seating mode to provide a convenient and comfortable ride quality (i.e., ensure ride quality) to a passenger seated on a rear seat and collectively drive respective electrically-powered portions of the rear seat to positions to secure the ride quality.

The system has a so-called 'monitor mode' which is a seating mode to collectively drive the respective electrically-powered portions of the rear seat so as to view a monitor apparatus primarily attached to a rear surface of a front seat.

The system has a so-called 'reading mode' which is a seating mode to collectively drive the respective electrically-powered portions of the rear seat so as to allow the passenger to easily perform reading on the rear seat by using a lighting lamp attached to a rear seat region.

Meanwhile, the system has a so-called 'return mode' which is a seating mode to collectively drive the respective electrically-powered portions of the front seat and the rear seat to positions just before moving the front seat and the rear seat to predetermined standard portions and the positions of the respective modes in either position of the relax mode, the monitor mode, and the reading mode for convenience of get-on and get-off of the passenger and initialization of the position of the rear seat.

Accordingly, the system of the present invention has a configuration given below for movement of the rear seat in the relax mode, the monitor mode, the reading mode, and the return mode.

FIG. 1 is a block diagram of a system for controlling a rear seat according to a seating mode of the present invention.

First, for easy description, among seats installed inside a vehicle, a driver's seat installed at a front side or a passenger's seat installed on the side of the driver's seat is called a front seat, a left rear seat or a right rear seat installed at a rear side is called a rear seat, and the front seats and the rear seats are electrically-powered seats in which respective portion of the seats are moved or controlled by drive force of a motor.

Referring to FIG. 1, the system includes a central control unit 10 which integratedly controls all electric portions of the vehicle and a passenger recognition unit 20 which is actuated by the central control unit 10 to receive signals from various passenger recognition means such as a door opening/closing sensing means, a passenger sensor, a start state sensing means, and a safety belt wearing sensing means of the vehicle and sense whether the passenger is present on the front seat.

The system includes a seating mode setting unit 30 actuated by the central control unit 10 to input a selection signal of any one mode of the relax mode, the monitor mode, the reading mode, and the return mode of the rear seat.

Figure 2:
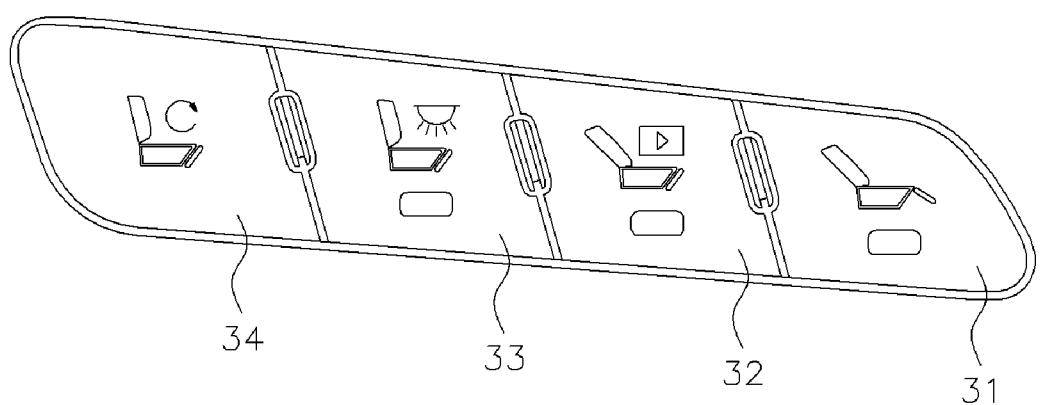
FIG. 2 is a diagram illustrating an embodiment of a seating mode setting unit of the system for controlling the rear seat according to the seating mode of the present invention.

FIG. 2 illustrates an exemplary embodiment of the seating mode setting unit 30 and preferably, the seating mode setting unit 30 is installed at one side of an arm rest laid on the rear seat.

The seating mode setting unit 30 according to the exemplary embodiment of the present invention, in which switches to select any one mode of the respective modes are arranged includes, in detail, a relax mode switch 31 for selecting the relax mode, a monitor mode switch 32 for selecting the monitor mode, a reading mode switch 33 for selecting the reading mode, and a return mode switch 34 for selecting the return mode.

Preferably, display lamps such as a light emitting diode (LED) representing whether each switch is turned on/off are installed in each of the switches 31, 32, 33, and 34.

Accordingly, the passenger of the rear seat operates any one switch among the respective switches provided in the seating mode setting unit 30 to select a desired seating mode.

The system for controlling a rear seat according to a seating mode of the present invention includes a seat control unit 100 that controls the positions of the seats installed in the vehicle according to input signals of the passenger recognition unit 20 and the seating mode setting unit 30.

The seat control unit 100 includes a front seat control unit 110 controlling the position of the front seat, a rear seat control unit 120 controlling the position of the rear seat, and a lumbar support control unit 130 controlling forward and backward positions of a lumbar support of the rear seat.

The front seat control unit 110 controls driving of a slide motor SLIDE MOTOR performing forward/backward slide movement of the seat of the front seat of the vehicle itself, a recline motor RECLINE MOTOR controlling a recline angle of a seat back part of the seat, a height control motor HEIGHT MOTOR controlling the height of the seat, a head rest height control motor HREST VERTICAL MOTOR controlling the height of the head rest, and a head rest forward/backward slide motor HREST SLIDE MOTOR performing the forward/backward slide movement of the head rest.

Similarly to the front seat control unit 110, the rear seat control unit 120 controls driving of a slide motor SLIDE MOTOR performing the forward/backward slide movement of the seat of the rear seat of the vehicle itself, a tilt motor TILT MOTOR controlling a tilting angle of the seat back part of the rear seat, a shoulder part control motor SHOULDER MOTOR controlling the recline angle of a shoulder part of the rear seat, a head rest height control motor HREST VERTICAL MOTOR controlling the height of the head rest, a head rest forward/backward slide motor HREST SLIDE MOTOR performing the forward/backward slide movement of the head rest, a lighting lamp LAMP attached to the rear seat region, and a monitor apparatus MONITOR primarily attached to a rear surface of the front seat.

Meanwhile, the front seat control unit 110 and the rear seat control unit 120 may additionally control all known seat controlling drive motor except for the respective drive motors of the seats and for example, primarily control a motor performing a vertical movement (so called, movement of a 'leg support') of a leg support portion separately mounted on the bottom of the rear seat.

Next, a method for controlling the rear seat, which is performed by the system of the present invention configured as above is described in detail for each seating mode, and the order of respective steps described below may be modified as necessary.

1) Relax Mode

Figure 3:
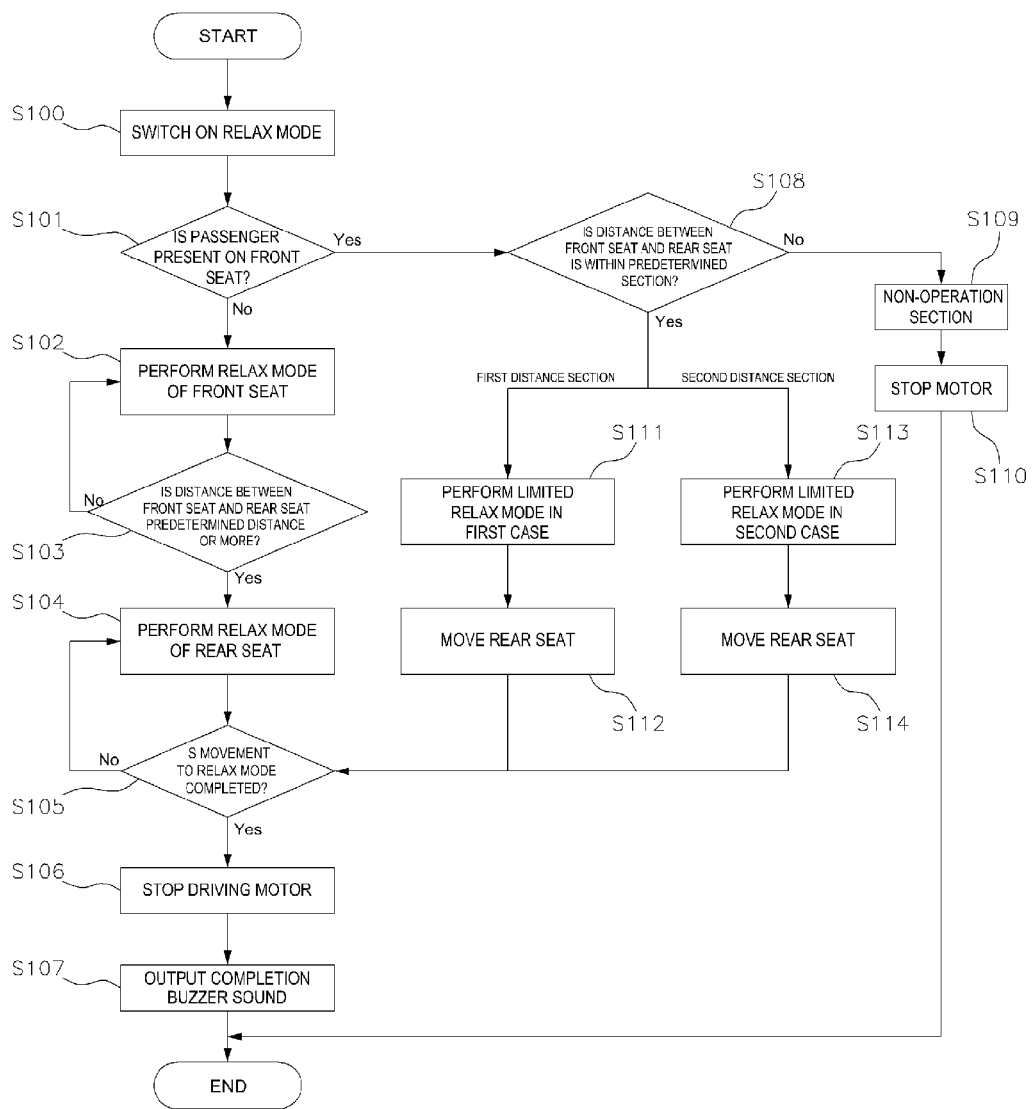
FIG. 3 is a flowchart for performing a relax mode of a method for controlling the rear seat according to the seating mode of the present invention.

The relax mode according to the present invention is the seating mode to provide a convenient and comfortable ride quality to a passenger seated on a rear seat and collectively move respective portions of the rear seat to positions to secure a ride quality. Referring to FIG. 3, an operating procedure of the relax mode of the method for controlling the rear seat according to the seating mode of the present invention will be described.

First, when the relax mode switch 31 is selected as an ON state in the seating mode setting unit 30 (S100), the passenger recognition unit 20 determines whether the passenger is present on the front seat according to input signals of a door opening/closing sensing means, a passenger sensor, a start state sensing means, and a safety belt wearing sensing means (S101).

As a result of determining whether the passenger is present on the front seat by the passenger recognition unit 20, when the passenger is not present on the front seat, the front seat control unit 110 performs movement of the front seat to the relax mode as a pre-operation for movement of the rear seat to the relax mode (S102).

In particular, the movement to the relax mode of the front seat drives the slide motor of the front seat to move the front seat in a forward direction and drives the recline motor of the front seat to control an angle of a seat back of the front seat in the forward direction and moreover, the height of the front seat and the position of the head rest also move to predetermined positions and a slide movement distance to the front of the front seat and control of the recline angle of the seat back to the front, the height of the front seat, and the height of the head rest are achieved in a predetermined distance and a predetermined angle range in the front seat control unit 110.

When the movement of the front seat to the relax mode is performed by the front seat control unit 110, the rear seat control unit 120 determines whether the front seat and the rear seat which move to the position of the relax mode are spaced apart from each other by a predetermined distance or more (S103).

Herein, in the relax mode of the present invention, a spacing distance from the front seat for moving the rear seat to the relax mode is preferably set within a range of approximately 800 to 1000 mm.

The spacing distance between the rear seat and the front seat as a distance between a front surface of a seat back of the rear seat and a rear surface of the front seat generally indicates a distance of a space in which the passenger is seated on the rear seat.

Subsequently, when the front seat and the rear seat are spaced apart from each other by the predetermined distance or more in step S103, the rear seat control unit 120 performs the movement of the rear seat to the relax mode (S104).

In particular, the movement of the rear seat to the relax mode drives the slide motor of the rear seat of the vehicle to move the rear seat in the forward direction, drives the tilt motor of the rear seat to control the height of a front end of a seat cushion, drives the shoulder part control motor of the rear seat to control the angle of the shoulder portion of the seat, drives the head rest height control motor and the head rest forward/backward slide motor of the rear seat to control the position of the head rest, and drives the lumbar support control unit 130 that receives an operation signal of the slide motor moving the rear seat forward/backward to control the position of the lumbar support.

The angle of the leg support portion may be controlled by driving the leg support control motor separately mounted on the bottom of the rear seat.

The rear seat moves to the relax mode in the distance and angle ranges preset in the rear seat control unit 120.

Next, when the positional movement of the rear seat to the relax mode of the present invention is completed (S105), the rear seat control unit 120 stops driving of all motors laid on the rear seat (S106), and the rear seat control unit 120 outputs a buzzer sound having a predetermined volume in order to notify that the positional movement to the relax mode is completed to the passenger (S107).

Figure 7:
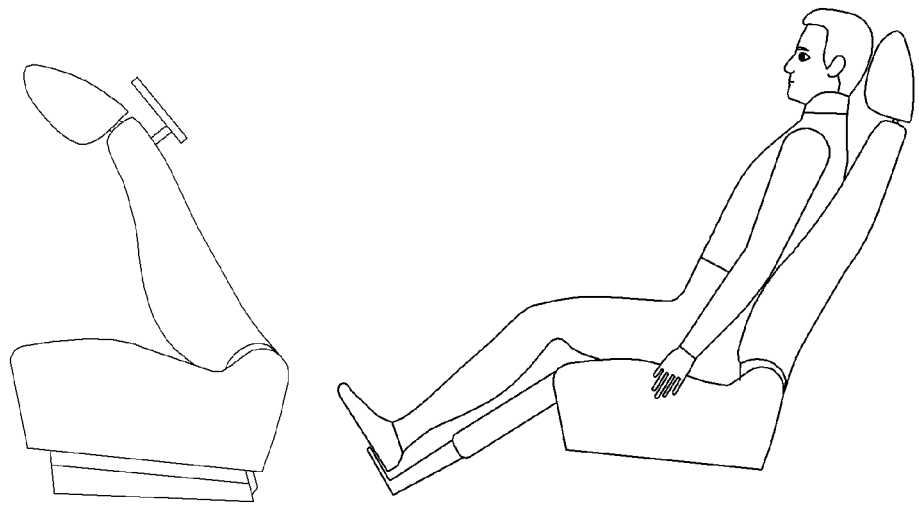
FIGS. 7 to 10 are diagrams illustrating a movement state of the rear seat according to the seating mode of the present invention.

FIG. 7 illustrates a state of the rear seat in the state in which the movement to the relax mode is performed, and the position of the rear seat moves so that the passenger who is seated is convenient and comfortable.

Meanwhile, although not illustrated in FIG. 7, while performing the movement of the rear seat to the relax mode by the rear seat control unit 120 (S104), when an error occurs in control of the movement to the relax mode, in the case where a predetermined object (for example, an object such as a coin) is suspended on a member that moves the front seat or the rear seat, and as a result, the corresponding movement is physically impossible or in the case where the passenger reinputs any one switch of the switches that belong to the seating mode setting unit 30, the rear seat control unit 120 stops driving of all motors laid on the rear seat to stop the movement of the rear seat to the relax mode.

When the movement to the corresponding mode stops under an abnormal situation while stopping, it is preferable to notify the abnormal situation to the passenger by flickering a display lamp such as a light emitting diode provided in the corresponding switch of the seating mode setting unit 30.

Next, in the step of determining whether the passenger is present on the front seat by the seating mode setting unit 30 in step S101, when the passenger is present on the front seat, in the method for controlling the rear seat according to the present invention, the position of the rear seat moves to the limited relax mode and the movement to the limited relax mode will be described below in detail.

First, when the passenger is present on the front seat, the rear seat control unit 120 determines whether the distance between the front seat where the passenger is present and the rear seat is within a predetermined distance section (S108). According to a result of the determination, when the distance between the front seat and the rear seat is not within the predetermined distance section (S109), the rear seat control unit 120 determines the section which is not within the predetermined distance section as a relax mode non-operation section in which the positional movement of the rear seat to the relax mode is impossible to stop the driving of all motors laid on the rear seat and stop the movement of the rear seat to the relax mode (S110).

According to the determination result, when the distance between the front seat and the rear seat is within a predetermined first distance section (S111), the rear seat control unit 120 determines the case as a first case in which the positional movement of the rear seat to the relax mode is restrictively possible and moves the rear seat to the predetermined relax mode according to the first case (S112).

Thereafter, when the movement of the rear seat in the relax mode according to the first case is completed, the rear seat control unit 120 stops the driving of all motors laid on the rear seat and the rear seat control unit 120 outputs the buzzer sound having the predetermined volume as described above in order to notify to the passenger that the positional movement to the relax mode is completed.

Meanwhile, according to the determination result, when the distance between the front seat and the rear seat is within a predetermined second distance section (S113), the rear seat control unit 120 determines the case as a second case in which the positional movement of the rear seat to the relax mode is restrictively possible and moves the rear seat to the predetermined relax mode according to the second case (S114).

Thereafter, when the movement of the rear seat in the relax mode according to the second case is completed, the rear seat control unit 120 stops the driving of all motors laid on the rear seat and the rear seat control unit 120 outputs the buzzer sound having the predetermined volume as described above in order to notify to the passenger that the positional movement to the relax mode is completed.

Preferably, in the step (S108) of determining whether the distance between the front seat where the passenger is present and the rear seat is within the predetermined distance section by the rear seat control unit 120, the predetermined distance between the front seat and the rear seat may be set to a distance in which the rear seat is slidable forward from a rearmost position. Herein, the distance in which the rear seat is slidable forward indicates a distance in which the rear seat is movable forward as long as the passenger of the rear seat does not contact the front seat.

For example, in the case where the distance in which the rear seat is slidable forward from the rearmost position is 0 to 100 mm, when the first distance section is set to 0 to 50 mm within the corresponding distance section and the second distance section is set to 50 to 100 mm, it is determined whether the distance in which the rear seat is slidable forward within a range in which the rear seat does not contact the front seat is up to the first distance section or the second distance section to restrictively perform the predetermined relax mode in the first case or the second case.

In this case, a positional movement amount of the rear seat to the relax mode according to the first case is smaller than the movement amount of the rear seat when the passenger is not present on the front seat and the positional movement amount of the rear seat to the relax mode according to the second case is larger than the positional movement amount of the rear seat to the relax mode according to the first case or smaller than the movement amount of the rear seat when the passenger is not present on the front seat.

In respect to the sections such as the first distance section and the second distance section on the spacing distance, the number of sections may increase or decrease as necessary.

Meanwhile, during restrictively performing the movement of the rear seat to the relax mode by the rear seat control unit 120 (S111 to S114), when an error occurs in control of the movement to the relax mode, in the case where a predetermined object (for example, an object such as a coin, or the like) is suspended on a member that moves the front seat or the rear seat, and as a result, the corresponding movement is physically impossible or in the case where the passenger reinputs any one switch of the switches that belong to the seating mode setting unit 30, the rear seat control unit 120 stops driving of all motors laid on the rear seat to stop the limited movement of the rear seat to the relax mode, of course as described above.

Figure 8:
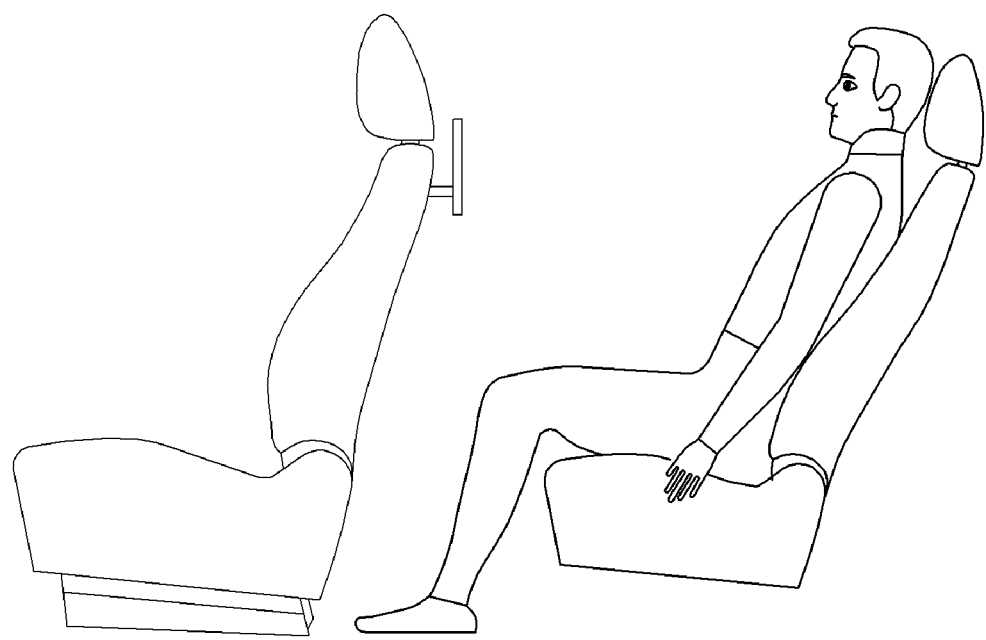

FIG. 8 illustrates a state of the rear seat in the state in which the limited movement to the relax mode is performed and illustrates that the rear seat moves shorter than the rear seat in the state of the rear seat in which the normal movement of the relax mode illustrated in FIG. 7 is performed.

2) Monitor Mode

Figure 4:
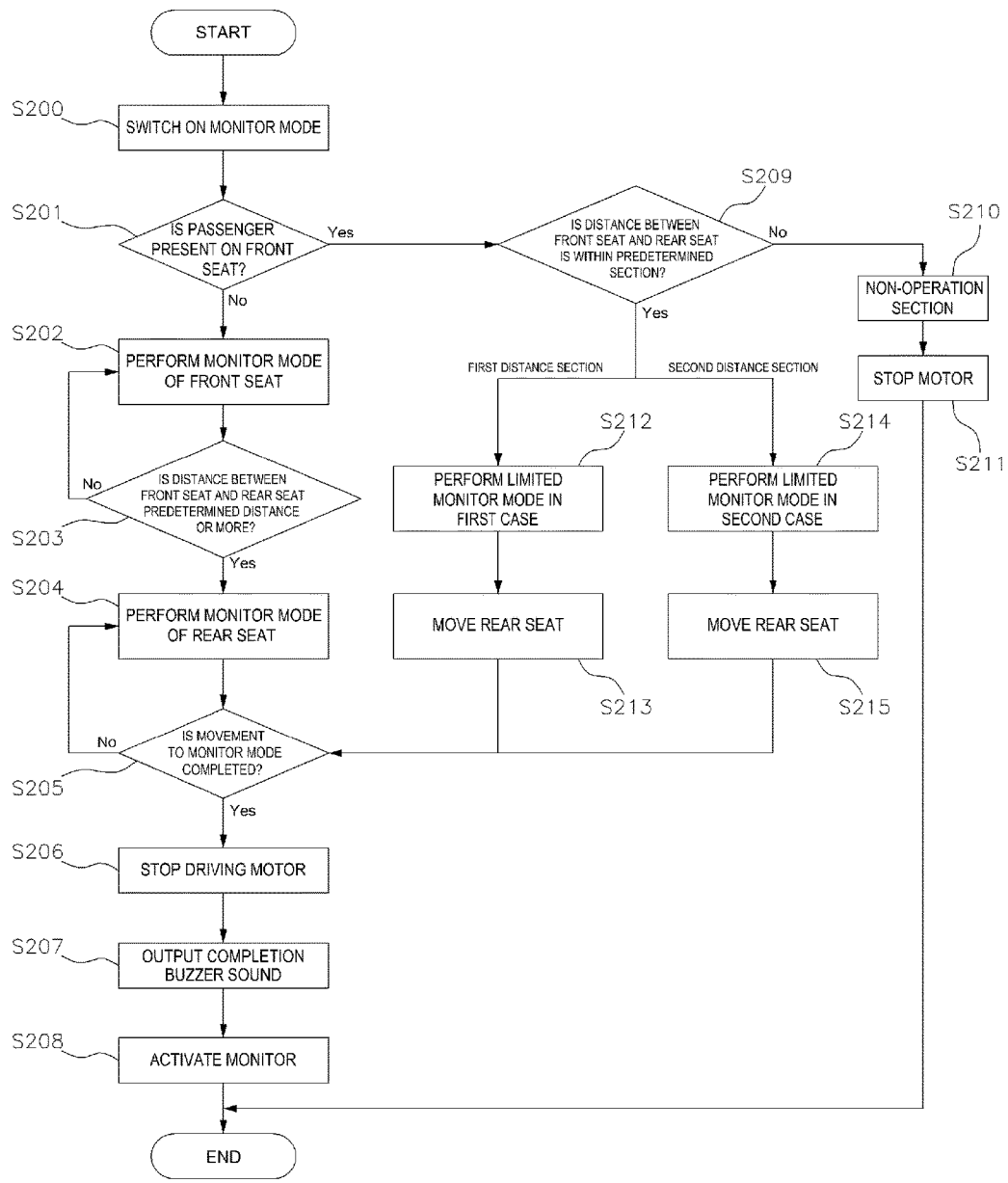
FIG. 4 is a flowchart for performing a monitor mode of the method for controlling the rear seat according to the seating mode of the present invention.

Referring to FIG. 4, an operating procedure of the monitor mode in the method for controlling the rear seat according to the seating mode of the present invention is described.

The operation of the monitor mode of the seat controlling method of the present invention is the seating mode to operate to collectively move the respective portions of the rear seat so as to view a monitor apparatus attached to the rear surface of the front seat.

First, when the monitor mode switch 32 is selected as the ON state in the seating mode setting unit 30 (S200), the passenger recognition unit 20 determines whether the passenger is present on the front seat having the monitor apparatus attached to the rear surface thereof according to input signals of the door opening/closing sensing means, the passenger sensor, the start state sensing means, and the safety belt wearing sensing means (S201).

As a result of determining whether the passenger is present on the front seat by the passenger recognition unit 20, when the passenger is not present on the front seat to which the monitor apparatus is attached, the front seat control unit 110 performs movement of the front seat to the monitor mode as a pre-operation for movement of the rear seat to the monitor mode (S202).

In particular, the movement of the front seat to the monitor mode drives the slide motor of the front seat to move the front seat to the backward direction and maintain the distance between the passenger of the rear seat and the monitor at an appropriate distance and drives the recline motor of the front seat to control the angle of the seat back of the front seat at a comparatively appropriate angle so that the passenger of the rear seat views the monitor, and the backward slide movement distance of the front seat and control of the recline angle of the seat back are achieved within predetermined distance and angle ranges in the front seat control unit 110.

When the movement of the front seat to the monitor mode is performed by the front seat control unit 110, the rear seat control unit 120 determines whether the distance between the front seat and the rear seat which move to the position of the monitor mode is within a predetermined distance section (S203).

Herein, in the monitor mode of the present invention, a spacing distance from the front seat for the rear seat to move to the monitor mode is preferably set within a range of approximately 800 to 1000 mm.

The spacing distance between the rear seat and the front seat as the distance between the front surface of the seat back of the rear seat and the rear surface of the front seat generally indicates the distance of the space in which the passenger is seated on the rear seat.

Subsequently, when the front seat and the rear seat are spaced apart from each other within the predetermined distance section in step S203, the rear seat control unit 120 performs the movement of the rear seat to the monitor mode (S204).

In particular, the movement of the rear seat to the monitor mode drives the slide motor of the rear seat of the vehicle to move the rear seat in the forward direction and make the distance from the monitor attached to the rear surface of the seat back of the front seat be closer, drives the shoulder part control motor of the rear seat to control the recline angle of the shoulder portion of the seat to an angle to view the monitor attached to the front seat, and drives the head rest height control motor and the head rest forward/backward slide motor of the rear seat to control the position of the head rest, which is suitable for viewing the monitor.

The rear seat moves to the monitor mode in the distance and angle ranges preset in the rear seat control unit 120.

Next, when the positional movement of the rear seat to the monitor mode of the present invention is completed (S205), the rear seat control unit 120 stops the driving of all motors laid on the rear seat (S206), the rear seat control unit 120 outputs the buzzer sound having the predetermined volume in order to notify that the positional movement to the monitor mode is completed to the passenger (S207), and activates the monitor apparatus by applying power to the monitor apparatus attached to the rear surface of the seat back of the front seat (S208) to allow the passenger who is seated on the rear seat to view desired contents through the monitor apparatus.

Figure 9:
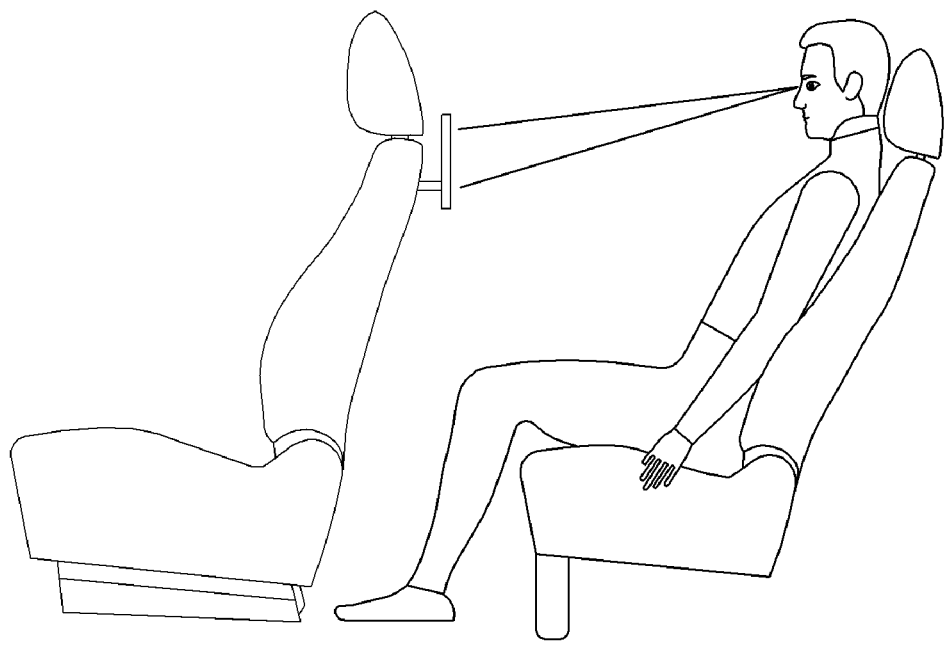

FIG. 9 illustrates a state of the rear seat in the state in which the movement to the monitor mode is performed and the position of the rear seat moves to a position suitable for the passenger who is seated views the monitor apparatus.

Meanwhile, although not illustrated, during performing the movement of the rear seat to the monitor mode by the rear seat control unit 120 (S204), when an error occurs in control of the movement to the monitor mode, in the case where a predetermined object (for example, an object such as a coin, or the like) is suspended on a member that moves the front seat or the rear seat, and as a result, the corresponding movement is physically impossible or in the case where the passenger reinputs any one switch of the switches that belong to the seating mode setting unit 30, the rear seat control unit 120 stops driving of all motors laid on the rear seat to stop the movement of the rear seat to the monitor mode.

Next, in the step of determining whether the passenger is present on the front seat by the seating mode setting unit 30 in step S201, when the passenger is present on the front seat, in the method for controlling the rear seat according to the present invention, the position of the rear seat moves to the limited monitor mode and the movement to the limited monitor mode will be described below in detail.

First, when the passenger is present on the front seat, the rear seat control unit 120 determines whether the distance between the front seat where the passenger is present and the rear seat is within a predetermined distance section (S209).

According to a result of the determination, when the distance between the front seat and the rear seat is not within the predetermined distance section (S210), the rear seat control unit 120 determines the section which is not within the predetermined distance section as a monitor mode non-operation section in which the positional movement of the rear seat to the monitor mode is impossible to stop the driving of all motors laid on the rear seat and stop the movement of the rear seat to the monitor mode (S211).

Further, according to the determination result, when the distance between the front seat and the rear seat is within the predetermined first distance section (S212), the rear seat control unit 120 determines the case as the first case in which the positional movement of the rear seat to the monitor mode is restrictively possible and moves the rear seat to the predetermined monitor mode according to the first case (S213).

Meanwhile, according to the determination result, when the distance between the front seat and the rear seat is within the predetermined second distance section (S214), the rear seat control unit 120 determines the case as the second case in which the positional movement of the rear seat to the monitor mode is restrictively possible and moves the rear seat to the predetermined monitor mode according to the second case (S215).

Thereafter, when the movement of the rear seat in the monitor mode according to the first and second cases is completed, the rear seat control unit 120 stops the driving of all motors laid on the rear seat and the rear seat control unit 120 notifies to the passenger that the positional movement to the monitor mode is completed through the buzzer sound and thereafter, activates the monitor apparatus as described above.

Preferably, in the step (S209) of determining whether the distance between the front seat where the passenger is present and the rear seat is within the predetermined distance section by the rear seat control unit 120, the predetermined distance between the front seat and the rear seat may be set to a distance in which the rear seat is slidable forward from a rearmost position similarly to the relax mode. Herein, the distance in which the rear seat is slidable forward indicates the distance in which the rear seat is movable forward as long as the passenger of the rear seat does not contact the front seat.

For example, in the case where the distance in which the rear seat is slidable forward from the rearmost position is 0 to 100 mm, when the first distance section is set to 0 to 50 mm within the corresponding distance section and the second distance section is set to 50 to 100 mm, it is determined whether the distance in which the rear seat is slidable forward within a range in which the rear seat does not contact the front seat is up to the first distance section or the second distance section to restrictively perform the predetermined monitor mode in the first case or the second case.

In this case, a positional movement amount of the rear seat to the monitor mode according to the first case is smaller than the movement amount of the rear seat when the passenger is not present on the front seat and the positional movement amount of the rear seat to the monitor mode according to the second case is larger than the positional movement amount of the rear seat to the monitor mode according to the first case or smaller than the movement amount of the rear seat when the passenger is not present on the front seat.

In this case, a positional movement amount of the rear seat to the monitor mode according to the first case is smaller than the movement amount of the rear seat when the passenger is not present on the front seat and the positional movement amount of the rear seat to the monitor mode according to the second case is larger than the positional movement amount of the rear seat to the monitor mode according to the first case or smaller than the movement amount of the rear seat when the passenger is not present on the front seat similarly to the relax mode.

Meanwhile, during restrictively performing the movement of the rear seat to the monitor mode by the rear seat control unit 120 (S212 to S215), when an error occurs in control of the movement to the monitor mode, in the case where a predetermined object (for example, an object such as a coin, or the like) is suspended on a member that moves the front seat or the rear seat, and as a result, the corresponding movement is physically impossible or in the case where the passenger reinputs any one switch of the switches that belong to the seating mode setting unit 30, the rear seat control unit 120 stops driving of all motors laid on the rear seat to stop the limited movement of the rear seat to the monitor mode as described above.

3) Reading Mode

Figure 5:
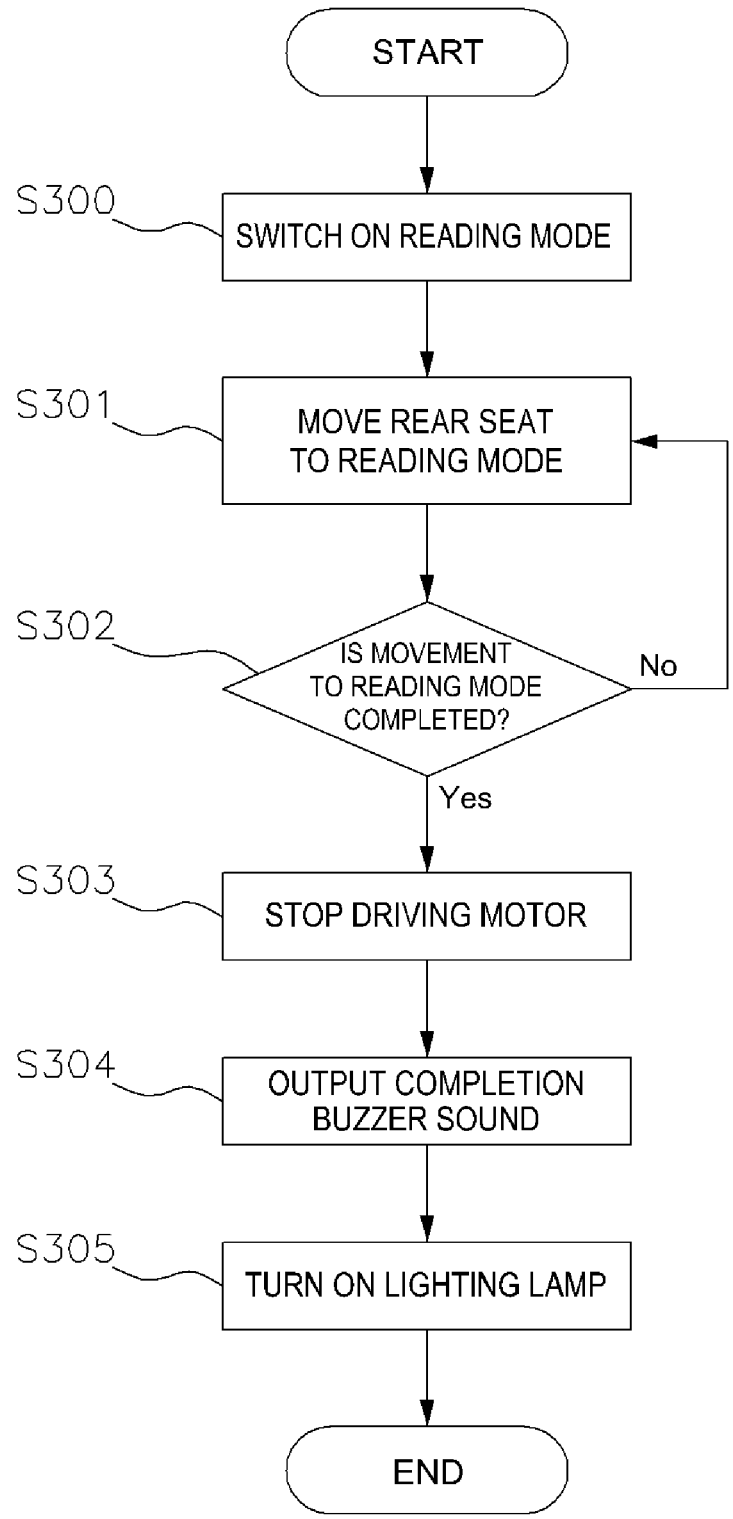
FIG. 5 is a flowchart for performing a reading mode of the method for controlling the rear seat according to the seating mode of the present invention.

The reading mode by the method for controlling a rear seat in the present invention is the reading mode to allow the passenger to easily perform reading on the rear seat by using a lighting lamp attached to a rear seat region and hereinafter, an operating procedure of the reading mode of the present invention will be described in detail with reference to FIG. 5.

Among the positional movement modes of the rear seat of the present invention, the reading mode is performed regardless of whether the passenger of the front seat is present in the vehicle.

First, when the reading mode switch 33 is selected as the ON state in the seating mode setting unit 30 (S300), the rear seat control unit 120 performs movement of the rear seat to the reading mode (S301).

In detail, the movement of the rear seat to the reading mode drives the slide motor of the rear seat of the vehicle to move the rear seat in the backward direction, drives the tilt motor of the rear seat to control the front end of the seat cushion downward, drives the shoulder part control motor of the rear seat to control the angle of the shoulder portion of the seat, drives the head rest height control motor and the head rest forward/backward slide motor of the rear seat to control the position of the head rest, and drives the lumbar support control unit 130 that receives an operation signal of the slide motor moving the rear seat forward/backward to control the position of the lumbar support and control the position and the angle of the rear seat to a position favorable for the passenger of the rear seat to perform reading or business.

The angle of the leg support portion may be controlled by driving the leg support control motor separately mounted on the bottom of the rear seat.

The rear seat moves to the reading mode in the distance and angle ranges preset in the rear seat control unit 120.

Next, when the positional movement of the rear seat to the reading mode of the present invention is completed (S302), the rear seat control unit 120 stops driving of all motors laid on the rear seat (S303) and the rear seat control unit 120 outputs the buzzer sound having the predetermined volume in order to notify that the positional movement to the reading mode is completed to the passenger (S304) and thereafter, turns on the lighting lamp attached to the rear seat region (S305) to provide a lighting required to perform the reading or business to the passenger of the rear seat.

Figure 10:
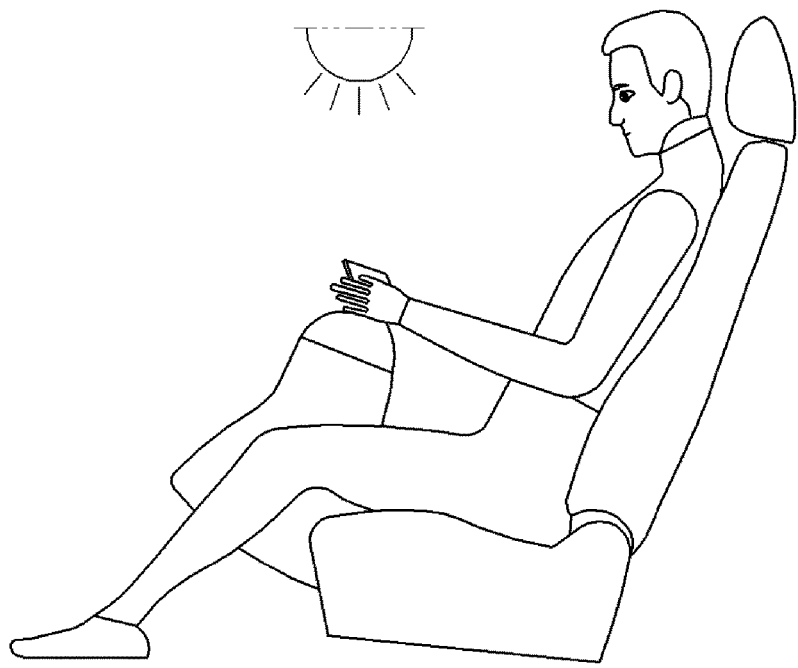

FIG. 10 illustrates a state of the rear seat in the state in which the movement to the reading mode is performed and the position of the rear seat moves to a position suitable for the passenger who is seated to maintain a position suitable for reading.

Meanwhile, although not illustrated, during performing the movement of the rear seat to the reading mode by the rear seat control unit 120 (S301), when an error occurs in control of the movement to the reading mode, in the case where a predetermined object (for example, an object such as a coin, or the like) is suspended on a member that moves the rear seat, and as a result, the corresponding movement is physically impossible or in the case where the passenger reinputs any one switch of the switches that belong to the seating mode setting unit 30, the rear seat control unit 120 stops driving of all motors laid on the rear seat to stop the movement of the rear seat to the reading mode as described above.

4) Return Mode

Figure 6:
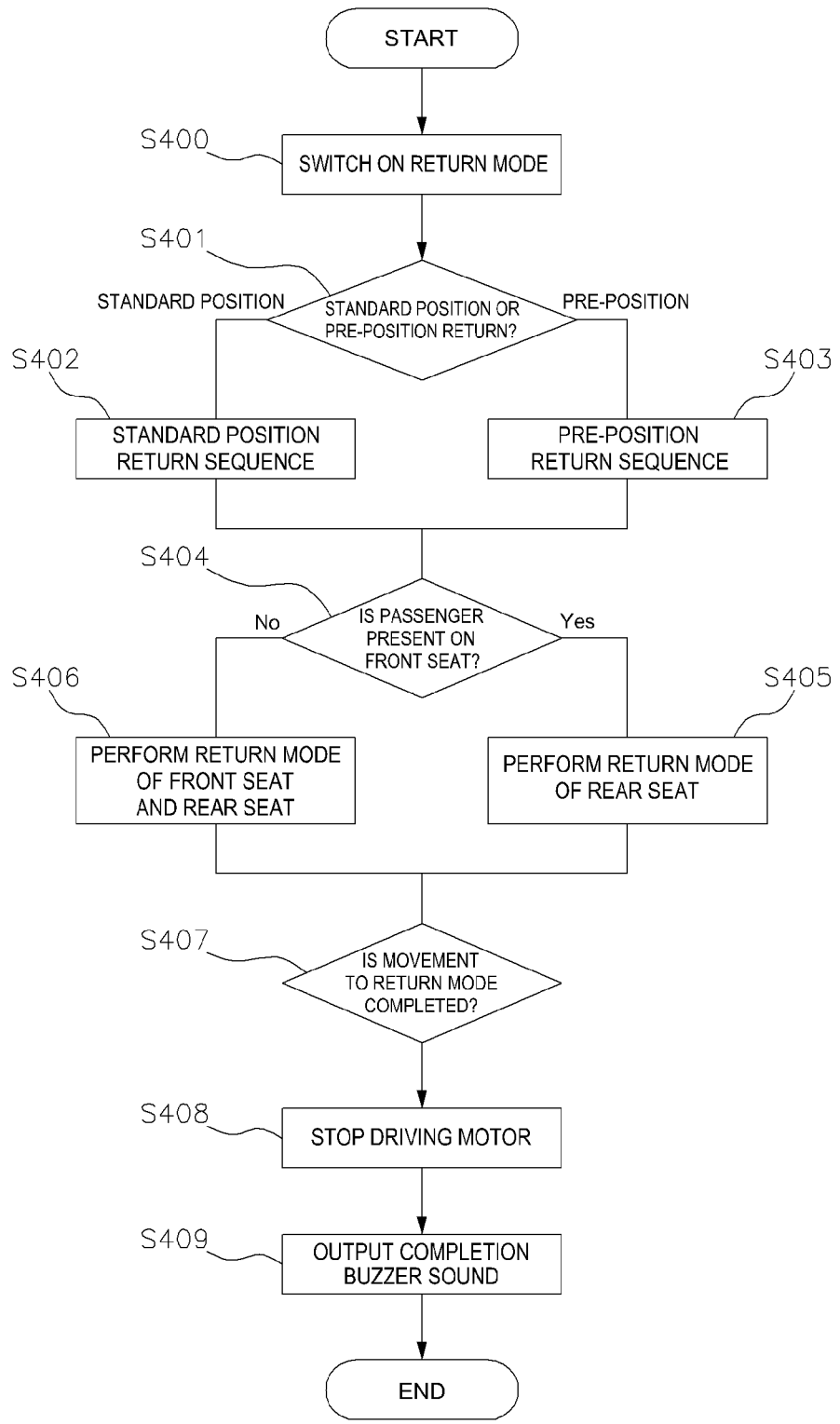
FIG. 6 is a flowchart for performing a return mode of the method for controlling the rear seat according to the seating mode of the present invention.

The return mode of the method for controlling the rear seat in the present invention which is used for convenience of get-on and get-off of the passenger and initialization of the position of the rear seat is a seating mode to move the front seat and the rear seat to positions just before moving the front seat and the rear seat to predetermined standard portions or the positions of the respective modes in a position of either mode of the relax mode, the monitor mode, and the reading mode and will be described in detail with reference to the flowchart for performing the return mode in the method for controlling the front seat and the rear seat according to the seating mode of the present invention of FIG. 6.

First, when the return mode switch 34 is selected in the seating mode setting unit 30 (S400), the seating mode setting unit 30 determines whether the return mode switch 34 selects movement (hereinafter, referred to as 'standard position return' for easy description) to standard positions of the front seat and the rear seat preset in the front seat control unit 110 and the rear seat control unit 120 or selects movement (hereinafter, referred to as 'pre-position return' for easy description) of the front seat and the rear seat to positions just before movement to the position of the respective modes (S401), and as a result, a standard position return sequence (S402) or a pre-position return sequence (S403) is performed according to a state of the return mode switch 34.

An operation of the return mode switch 34 for performing the standard position return sequence (S402) or the pre-position return sequence (S403) determines that the standard position return is selected when the return mode switch 34 is pressed short, while the pre-position return is selected when the return mode switch 34 is pressed long to perform each return mode according to the exemplary embodiment of the present invention.

Subsequently, when a type of return mode is selected as described above, the passenger recognition unit 20 determines whether the passenger is present on the front seat according to the input signal of any one switch or sensor among the door switch, the passenger sensor, the start sensor, and the safety belt switch (S404).

As a result of determining whether the passenger is present on the front seat by the passenger recognition unit 20, when the passenger is present on the front seat, the rear seat control unit 120 performs positional movement of only the rear seat to the return mode (S405).

On the contrary, as the result of determining whether the passenger is present on the front seat by the passenger recognition unit 20, when the passenger is not present on the front seat, the front seat control unit 110 performs positional movement of the front seat to the return mode and simultaneously the rear seat control unit 120 performs positional movement of the rear seat to the return mode (S406).

Next, when the positional movement of the front seat or the rear seat to the return mode is completed (S407), the front seat control unit 110 or the rear seat control unit 120 stops driving of all motors laid on the front seat or the rear seat (S408) and the front seat control unit 110 or the rear seat control unit 120 outputs the buzzer sound having the predetermined volume in order to notify that the positional movement to the return mode is completed to the passenger (S409).

Meanwhile, although not illustrated, during performing the movement to the return mode (S405 and S406), when an error occurs in control of the movement to the monitor mode, in the case where a predetermined object (for example, an object such as a coin, or the like) is suspended on a member that moves the front seat or the rear seat, and as a result, the corresponding movement is physically impossible or in the case where the passenger reinputs any one switch of the switches that belong to the seating mode setting unit 30, the front seat control unit 110 or the rear seat control unit 120 stops driving of all motors laid on the front seat or the rear seat to stop the movement to the return mode as described above and in this case, at the time of stopping the movement to the corresponding mode under such an abnormal situation, the abnormal situation may be notified to the passenger by flickering the display lamp such as the light emitting diode provided in the corresponding switch of the seating mode setting unit 30.

A configuration and an operation of a system for controlling a rear seat according to a seating mode and a method therefor in the present invention have been described with reference to the accompanying drawings, but the exemplary embodiments are exemplary and the scope of the present invention is not limited thereto and the scope of the present invention is determined according to matters disclosed in the claims including various modified exemplary embodiments and exemplary embodiments of a range equivalent thereto.

What is claimed is:

1. A system for controlling a rear seat of a vehicle, the system comprising:
    a central control unit of the vehicle;
    a passenger recognition unit actuated by the central control unit to sense whether a passenger is present on a front seat of the vehicle;
    a seating mode setting unit inputting a selection signal of a seating mode of the rear seat; and
    a seat control unit including a front seat control unit and a rear seat control unit sequentially driving respective electrically-powered portions of the front seat and the rear seat installed in the vehicle according to input of a passenger sensing signal of the passenger recognition unit and the selection signal of the seating mode of the seating mode setting unit,
    wherein the seating mode is selectable between a relax mode, a monitor mode, and a reading mode, in which the seating mode setting unit includes a relax mode switch for selecting the relax mode, a monitor mode switch for selecting the monitor mode, and a reading mode switch for selecting the reading mode,
    wherein in the relax mode, the seat control unit is configured to sequentially drive the respective electrically-powered portions of the rear seat to a position to ensure ride quality to the passenger who is seated on the rear seat,
    wherein in the monitor mode, the seat control unit is configured to sequentially drive the respective electrically-powered portions of the rear seat so as to allow the passenger to view a monitor apparatus attached to a rear surface of the front seat, and
    wherein in the reading mode, the seat control unit is configured to sequentially drive the respective electrically-powered portions of the rear seat so as to allow the passenger to perform reading by using a lighting lamp attached to a rear seat region.

2. The system of claim 1,
    wherein the seating mode is further selectable to a return mode,
    wherein the seating mode setting unit further includes a return mode switch for selecting the return mode, and
    wherein in the return mode, the seat control unit is configured to sequentially drive the respective electrically-powered portions of the front seat and the rear seat to positions just before moving the front seat and the rear seat to predetermined standard positions or positions of the seating mode for get-on and get-off convenience of the passenger and initialization of the position of the rear seat.

3. The system of claim 1, wherein the seat control unit further includes a lumbar support control unit controlling a forward/backward position of a lumbar support device of the rear seat.

4. A method for controlling a rear seat, which is performed by a system for controlling the rear seat of a vehicle, including a central control unit of the vehicle, a passenger recognition unit sensing whether a passenger is present on a front seat, a seating mode setting unit inputting a selection signal of the seating mode of the rear seat, a front seat control unit controlling the position of the front seat, and a rear seat control unit controlling the position of the rear seat, the method comprising the steps of:
    sequentially controlling, by the front seat control unit and the rear seat control unit, driving the respective electrically-powered portions of the front seat and the rear seat installed in the vehicle according to input of a passenger sensing signal of the passenger recognition unit and the selection signal of the seating mode of the seating mode setting unit; and
    performing a relax mode to sequentially drive the respective electrically-powered portions of the rear seat to a position to ensure ride quality to the passenger who is seated on the rear seat,
    wherein the step of performing the relax mode further comprises:

determining, by the passenger recognition unit, when the relax mode switch is selected as an ON state in the seating mode setting unit, whether the passenger is present on the front seat;

performing, by the front seat control unit, as a result of determining whether the passenger is present on the front seat by the passenger recognition unit, when the passenger is not present on the front seat, movement of the front seat to the relax mode as a pre-operation for movement of the rear seat to the relax mode;

determining, by the rear seat control unit, when the movement of the front seat to the relax mode is performed by the front seat control unit, whether the front seat and the rear seat which move to the position of the relax mode are spaced apart by a predetermined distance or more;

performing, by the rear seat control unit, when the front seat and the rear seat are spaced apart from each other by the predetermined distance or more, the movement of the rear seat to the relax mode; and stopping, by the rear seat control unit, when the positional movement of the rear seat to the relax mode of the present invention is completed, driving of all motors laid on the rear seat and notifying, by the rear seat control unit, that the positional movement to the relax mode is completed to the passenger.

5. The method of claim 4, further comprising:

in the step of determining whether the passenger is present on the front seat by the seating mode setting unit, when the passenger is present on the front seat, determining, by the rear seat control unit, whether a distance between the front seat where the passenger is present and the rear seat is within a predetermined distance section;

determining, by the rear seat control unit, when the distance between the front seat and the rear seat is not within the predetermined distance section, the section which is not within the predetermined distance section as a relax mode non-operation section in which the positional movement of the rear seat to the relax mode is impossible to stop the driving of all motors laid on the rear seat and stop the movement of the rear seat to the relax mode;

determining, by the rear seat control unit, when the distance between the front seat and the rear seat is within a predetermined first distance section, the case as a first case in which the positional movement of the rear seat to the relax mode is restrictively possible and moving the rear seat to the predetermined relax mode according to the first case; and determining, by the rear seat control unit, when the distance between the front seat and the rear seat is within a predetermined second distance section, the case as a second case in which the positional movement of the rear seat to the relax mode is restrictively possible and moving the rear seat to the predetermined relax mode according to the second case.

6. The method of claim 4, further comprising the step of:

performing a monitor mode to sequentially drive the respective electrically-powered portions of the rear seat so as to view a monitor apparatus attached to a rear surface of the front seat.

7. The method of claim 6, wherein the step of performing the monitor mode further comprises:

determining, by the passenger recognition unit, when the monitor mode switch is selected as the ON state in the seating mode setting unit, whether the passenger is present on the front seat having the rear surface to which the monitor apparatus is attached;

performing, by the front seat control unit, whether the passenger is present on the front seat by the passenger recognition unit, when the passenger is not present on the front seat to which the monitor apparatus is attached, movement of the front seat to the monitor mode as a pre-operation for movement of the rear seat to the monitor mode;

determining, by the rear seat control unit, when the movement of the front seat to the monitor mode is performed by the front seat control unit, whether the front seat and the rear seat which move to the position of the monitor mode are spaced apart by a predetermined distance or more;

performing, by the rear seat control unit, when the front seat and the rear seat are spaced apart from each other with the predetermined distance or more or less, the movement of the rear seat to the monitor mode; and stopping, by the rear seat control unit, when the positional movement of the rear seat to the monitor mode of the present invention is completed, driving of all motors laid on the rear seat, notifying, by the rear control unit, that the positional movement to the monitor mode is completed to the passenger, and activating the monitor apparatus by applying the power to the monitor apparatus attached to the rear surface of the seat back of the front seat.

8. The method of claim 7, further comprising:

determining, by the rear seat control unit, when the passenger is present on the front seat, whether the distance between the front seat where the passenger is present and the rear seat is within a predetermined distance section;

determining, by the rear seat control unit, when the distance between the front seat and the rear seat is not within the predetermined distance section, the section which is not within the predetermined distance section as a monitor mode non-operation section in which the positional movement of the rear seat to the monitor mode is impossible to stop the driving of all motors laid on the rear seat and stop the movement of the rear seat to the monitor mode;

determining, by the rear seat control unit, when the distance between the front seat and the rear seat is within a predetermined first distance section, the case as a first case in which the positional movement of the rear seat to the monitor mode is restrictively possible and moving the rear seat to the predetermined monitor mode according to the first case; and determining, by the rear seat control unit, when the distance between the front seat and the rear seat is within a predetermined second distance section, the case as a second case in which the positional movement of the rear seat to the monitor mode is restrictively possible and moving the rear seat to the predetermined monitor mode according to the second case.

9. The method of claim 4, further comprising the step of:

performing a reading mode to sequentially drive the respective electrically-powered portions of the rear seat so as to allow the passenger to perform reading on the rear seat by using a lighting lamp attached to a rear seat region.

10. The method of claim 9, wherein the step of performing the reading mode includes:

performing, by the rear seat control unit, when the reading mode switch is selected as the ON state in the seating mode setting unit, movement of the rear seat to the reading mode; and stopping, by the rear seat control unit, when the positional movement of the rear seat to the reading mode of the present invention is completed, driving of all motors laid on the rear seat, notifying, by the rear seat control unit, that the positional movement to the reading mode is completed to the passenger, and turning on the lighting lamp attached to the rear seat region to provide a lighting required for the passenger of the rear seat.

11. The method of claim 4, wherein a return mode to sequentially drive the respective electrically-powered portions of the front seat and the rear seat to positions just before moving the front seat and the rear seat to predetermined standard positions or positions of the seating mode for get-on and get-off convenience of the passenger and initialization of the position of the rear seat is performed.

12. The method of claim 11, wherein when a return mode switch is selected in the seating mode setting unit, the seating mode setting unit determines whether the return mode switch selects movement to standard positions of the front seat and the rear seat preset in the front seat control unit and the rear seat control unit or selects movement of the front seat and the rear seat to positions just before movement to the position of the respective modes, and as a result, a standard position return sequence or a pre-position return sequence is performed according to a state of the return mode switch, the method comprising:

determining, by the passenger recognition unit, when a type of the return mode is selected, whether the passenger is present on the front seat, performing, by the rear seat control unit, as a result of determining whether the passenger is present on the front seat by the passenger recognition unit, when the passenger is present on the front seat, positional movement of only the rear seat to the return mode, performing, by the front seat control unit, as the result of determining whether the passenger is present on the front seat by the passenger recognition unit, when the passenger is not present on the front seat, positional movement of the front seat to the return mode and performing, by the rear seat control unit, positional movement of the rear seat to the return mode, and stopping, by the front seat control unit or the rear seat control unit, when the positional movement of the front seat or the rear seat to the return mode is completed, driving of all motors laid on the front seat and the rear seat and notifying, by the front seat control unit or the rear seat control unit, that the positional movement to the return mode is completed to the passenger.

* * * * *